United States Patent
Cho

(10) Patent No.: US 9,488,724 B2
(45) Date of Patent: Nov. 8, 2016

(54) METHOD FOR MULTI-MODE OBSTACLE DETECTION USING RADAR, AND APPARATUS FOR SAME

(75) Inventor: Poong Youn Cho, Seoul (KR)

(73) Assignee: METABUILD CO.,LTD., Seoul (KR)

( * ) Notice: Subject to any disclaimer, the term of this patent is extended or adjusted under 35 U.S.C. 154(b) by 434 days.

(21) Appl. No.: 14/351,210

(22) PCT Filed: Nov. 8, 2011

(86) PCT No.: PCT/KR2011/008475

§ 371 (c)(1),
(2), (4) Date: Apr. 11, 2014

(87) PCT Pub. No.: WO2013/058428

PCT Pub. Date: Apr. 25, 2013

(65) Prior Publication Data

US 2014/0240167 A1 Aug. 28, 2014

(30) Foreign Application Priority Data

Oct. 18, 2011 (KR) .......................... 10-2011-0106330

(51) Int. Cl.
*G01S 13/58* (2006.01)
*G01S 13/92* (2006.01)
(Continued)

(52) U.S. Cl.
CPC .............. *G01S 13/58* (2013.01); *G01S 7/292* (2013.01); *G01S 7/414* (2013.01); *G01S 13/52* (2013.01);
(Continued)

(58) Field of Classification Search
CPC ................ G01S 7/292–7/2927; G01S 7/414; G01S 13/52; G01S 13/5244; G01S 13/58; G01S 13/86; G01S 13/867; G01S 13/92; G08G 1/00; G08G 1/01; G08G 1/048; G08G 1/052; G08G 1/16

USPC ....................................... 342/70–72
See application file for complete search history.

(56) References Cited

U.S. PATENT DOCUMENTS 4,097,864 A * 6/1978 Endo ....................... G01S 13/60
342/109
5,101,200 A * 3/1992 Swett ................. G06Q 30/0284
235/437

(Continued)

FOREIGN PATENT DOCUMENTS

| JP | 08-161697 A | 6/1996 |
| JP | 2009-047633 A | 3/2009 |
| KR | 10-2001-0041181 A | 5/2011 |

OTHER PUBLICATIONS

International Search Report for PCT/KR2011/008475 mailed Oct. 23, 2012 from Korean Intellectual Property Office.

*Primary Examiner* — Peter Bythrow
(74) *Attorney, Agent, or Firm* — Paratus Law Group, PLLC

(57) ABSTRACT

The present invention relates to a method for multi-mode obstacle detection using radar, including the steps of: determining whether an object moves by acquiring radar information on the object; discriminating between a stationary object and a moving object according to whether the object moves; executing a first detecting mode for detecting the stationary object or a second detecting mode for detecting the moving object; and transmitting location information on the stationary object obtained through the first detecting mode, or location and speed information on the moving object obtained through the second detecting mode, to an external terminal. According to the method for multi-mode obstacle detection using radar, and to the apparatus for same, multi-detection modes can be provided to separately detect a stationary object and a moving object using the radar information on the object obtained using radar, thereby increasing location tracking efficiency for each object.

10 Claims, 4 Drawing Sheets

(51) Int. Cl.

| | |
|---|---|
| *G01S 7/292* | (2006.01) |
| *G01S 7/41* | (2006.01) |
| *G01S 13/52* | (2006.01) |
| *G01S 13/86* | (2006.01) |
| *G08G 1/048* | (2006.01) |
| *G08G 1/052* | (2006.01) |
| *G08G 1/01* | (2006.01) |
| *G01S 13/524* | (2006.01) |

(52) U.S. Cl.
CPC .......... *G01S 13/5244* (2013.01); *G01S 13/867* (2013.01); *G01S 13/92* (2013.01); *G08G 1/01* (2013.01); *G08G 1/048* (2013.01); *G08G 1/052* (2013.01)

(56) References Cited

U.S. PATENT DOCUMENTS

| | | | | |
|---|---|---|---|---|
| 5,339,081 A * | 8/1994 | Jefferis | ................... | G01S 7/023 342/28 |
| 5,455,768 A * | 10/1995 | Johnson | ................... | G01P 3/66 324/238 |
| 5,555,036 A * | 9/1996 | Harnett | ................... | G08G 1/01 340/933 |
| 5,717,390 A * | 2/1998 | Hasselbring | ............ | G01S 7/411 235/379 |
| 5,754,099 A * | 5/1998 | Nishimura | ................ | B60T 7/22 340/435 |
| 5,818,383 A * | 10/1998 | Stockburger | ............. | G01S 3/46 342/109 |
| 6,127,965 A * | 10/2000 | McDade | ............... | G01S 13/931 342/104 |
| 6,198,426 B1 * | 3/2001 | Tamatsu | ................ | G01S 13/931 342/114 |
| 6,198,427 B1 * | 3/2001 | Aker | ........................ | G01S 7/04 342/104 |
| 6,226,389 B1 * | 5/2001 | Lemelson | ............ | G01S 13/931 382/104 |
| 6,311,123 B1 * | 10/2001 | Nakamura | ......... | B60K 31/0008 123/352 |
| 6,317,073 B1 * | 11/2001 | Tamatsu | .................. | G01S 7/352 342/109 |
| 6,420,996 B1 * | 7/2002 | Stopczynski | ......... | G01S 13/765 340/435 |
| 6,631,324 B2 * | 10/2003 | Okamura | ................ | G01S 7/412 701/301 |
| 6,838,981 B2 * | 1/2005 | Zoratti | ................... | B60Q 9/008 340/435 |
| 7,382,310 B1 * | 6/2008 | Piesinger | .............. | G01S 13/325 340/541 |
| 7,616,293 B2 * | 11/2009 | Sirota | .................... | G08G 1/052 356/28 |
| 8,305,254 B2 * | 11/2012 | Nanami | ................ | G01S 13/426 342/70 |
| 8,606,539 B2 * | 12/2013 | Takabayashi | ....... | G06K 9/00798 180/169 |
| 8,665,135 B2 * | 3/2014 | Dai | ........................ | G01S 7/062 342/160 |
| 2008/0042894 A1 * | 2/2008 | Kikuchi | .............. | B60W 10/184 342/71 |
| 2008/0102756 A1 * | 5/2008 | Lehtinen | ................... | G01S 5/00 455/67.11 |
| 2013/0063257 A1 * | 3/2013 | Schwindt | ................... | B60W 30/095 340/425.5 |
| 2013/0113647 A1 * | 5/2013 | Sentelle | ................... | G01S 13/32 342/22 |
| 2013/0321195 A1 * | 12/2013 | Moriuchi | ................ | G01S 13/52 342/70 |

* cited by examiner

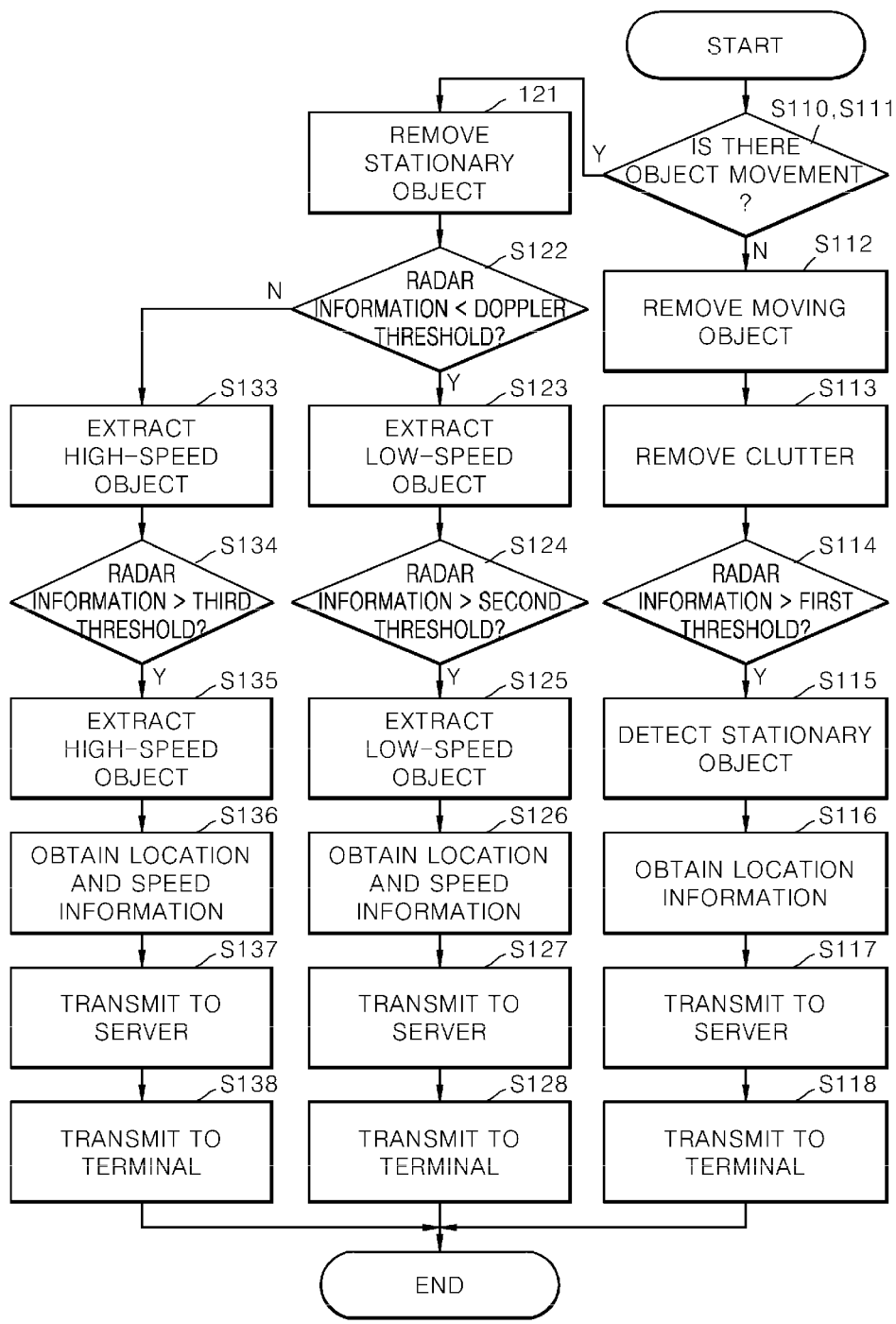

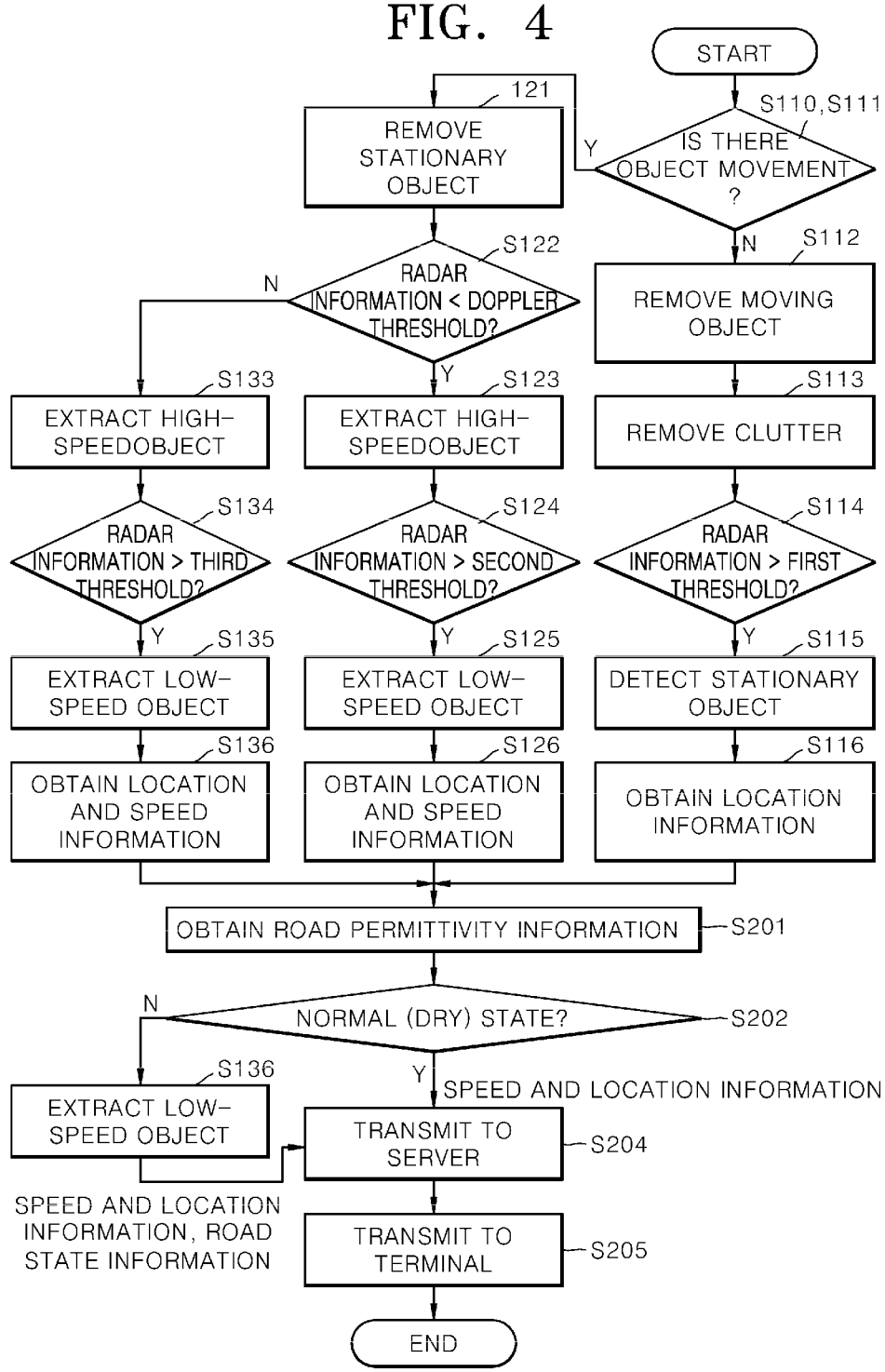

METHOD FOR MULTI-MODE OBSTACLE DETECTION USING RADAR, AND APPARATUS FOR SAME

CROSS REFERENCE TO PRIOR APPLICATION

This application is a National Stage Patent Application of PCT International Patent Application No. PCT/KR2011/008475 (filed on Nov. 8, 2011) under 35 U.S.C. §371, which claims priority to Korean Patent Application No. 10-2011-0106330 (filed on Oct. 18, 2011) which are all hereby incorporated by reference in their entirety.

TECHNICAL FIELD

The present invention relates to a method for multi-mode obstacle detection using radar, and an apparatus for same, and more particularly, to a method for multi-mode obstacle detection using radar, whereby a location of an object can be tracked in various modes by discriminating between a stationary object and a moving object using radar, and an apparatus for same.

BACKGROUND ART

There is always an accident possibility in a road traffic used by vehicles and persons, and in actuality, many traffic accidents and dangerous situations occur a day on a national scale. In particular, there is a large possibility that a driver's peripheral situation perception ability may be dramatically lowered in a ultra high speed driving environment, such as, in a highway, or at night, which may immediately cause a large traffic accident.

Although various techniques for detecting road situations have been proposed, the conventional art is limited to a technique for detecting a front object and notifying the result of detection using an infrared camera installed at a road or vehicle, and this technique has a disadvantage that detection efficiency is lowered. Actually, there are various cases where a stationary object and a moving object are on a road. These cases need to be discriminated therebetween and to be detected.

DETAILED DESCRIPTION OF THE INVENTION

Technical Problem

The present invention provides a method for multi-mode obstacle detection using radar, whereby multi-detection modes can be provided to separately detect a stationary object and a moving object using radar information on an object obtained using radar so that location tracking efficiency for each object can be increased, and an apparatus for same.

Technical Solution

According to an aspect of the present invention, there is provided a method for multi-mode obstacle detection using radar, including: determining whether an object moves by acquiring radar information on the object; discriminating between a stationary object and a moving object according to whether the object moves; executing a first detecting mode for detecting the stationary object or a second detecting mode for detecting the moving object; and transmitting location information on the stationary object obtained through the first detecting mode, or location and speed information on the moving object obtained through the second detecting mode, to an external terminal.

The executing of the first detecting mode may include: removing radar information on the moving object; if the radar information on the stationary object exceeds a threshold for detecting the stationary object stored in a reference map obtained based on statistical values of past radar information, determining that the stationary object is valid; and obtaining location information on the stationary object using the radar information on the stationary object.

The executing of the second detecting mode may include: removing the radar information on the stationary object; if the radar information on the moving object is less than a predetermined doppler threshold, determining the moving object as a low-speed object; if the radar information on the low-speed object exceeds a threshold for detecting the low-speed object stored in the reference map, determining the low-speed object to be valid; and obtaining location information and speed information on the low-speed object using the radar information on the low-speed object.

The method may further include: if the radar information on the moving object exceeds the predetermined doppler threshold, determining the moving object as a high-speed object; if radar information on the high-speed object exceeds a threshold for detecting the high-speed object stored in the reference map, determining the high-speed object to be valid; and obtaining location information and speed information on the high-speed object using the radar information on the high-speed object.

The method may further include, after location information and speed information on the moving object are obtained, driving a tracking camera on a road where the moving object is placed, so as to receive a captured image on the moving object.

The method may further include, after the location information or speed information on the stationary object or moving object is obtained: obtaining permittivity information on the road where the object is placed; if the obtained road permittivity information is within a predetermined normal range, transmitting the location information or speed information to an external server or the external terminal; and if the obtained permittivity information exceeds the normal range, transmitting the location information or speed information, and state information on the road corresponding to permittivity of the road to the server or the external terminal.

According to another aspect of the present invention, there is provided an apparatus for multi-mode obstacle detection using radar, including: a movement determining unit determining whether an object moves using a radar apparatus that acquires radar information on the object; an object discriminating unit discriminating between a stationary object and a moving object according to whether the object moves; a mode executing unit executing a first detecting mode for detecting the stationary object or a second detecting mode for detecting the moving object; and a transmitting unit transmitting location information on the stationary object obtained through the first detecting mode, or location and speed information on the moving object obtained through the second detecting mode, to an external terminal.

The mode executing unit may remove radar information on the moving object when the first detecting mode is executed, and if the radar information on the stationary object exceeds a threshold for detecting the stationary object stored in a reference map obtained based on statistical values of past radar information, the mode executing unit may determine that the stationary object is valid and may obtain location information on the stationary object using the radar information on the stationary object.

The mode executing unit may remove the radar information on the stationary object when the second detecting mode is executed, and if the radar information on the moving object is less than a predetermined doppler threshold, the mode executing unit may determine the moving object as a low-speed object, and if the radar information on the low-speed object exceeds a threshold for detecting the low-speed object stored in the reference map, the mode executing unit may determine the low-speed object to be valid and may obtain location information and speed information on the low-speed object using the radar information on the low-speed object.

If the radar information on the moving object exceeds the predetermined doppler threshold, the mode executing unit may determine the moving object as a high-speed object, and if radar information on the high-speed object exceeds a threshold for detecting the high-speed object stored in the reference map, the mode executing unit may determine the high-speed object to be valid and may obtain location information and speed information on the high-speed object using the radar information on the high-speed object.

The apparatus may further include an image receiving unit receiving a captured image on the moving object by driving a tracking camera on a road where the moving object is placed.

The apparatus may further include a road surface information obtaining unit obtaining permittivity information on the road where the object is placed, after the location information or speed information on the stationary object or moving object is obtained, wherein, if the obtained road permittivity information is within a predetermined normal range, the transmitting unit may transmit the location information or speed information to an external server or the external terminal, and if the obtained permittivity information exceeds the normal range, the transmitting unit may transmit the location information or speed information, and state information on the road corresponding to permittivity of the road to the server or the external terminal.

Effect of the Invention

In a method for multi-mode obstacle detection using radar and an apparatus for same according to the present invention, multi-detection modes can be provided to separately detect a stationary object and a moving object using radar information on an object obtained using radar so that location tracking efficiency for each object can be increased. Also, a stationary object, a low-speed object, or a high-speed object can be efficiently detected based on probabilistic statistical data of the previously-collected radar information so that reliability of the result of detection can be enhanced.

DESCRIPTION OF THE DRAWINGS

FIG. 3 is a flowchart illustrating a method for obstacle detection using radar using FIG. 2.

FIG. 4 illustrates another embodiment of FIG. 3.

BEST MODE

Figure 1:
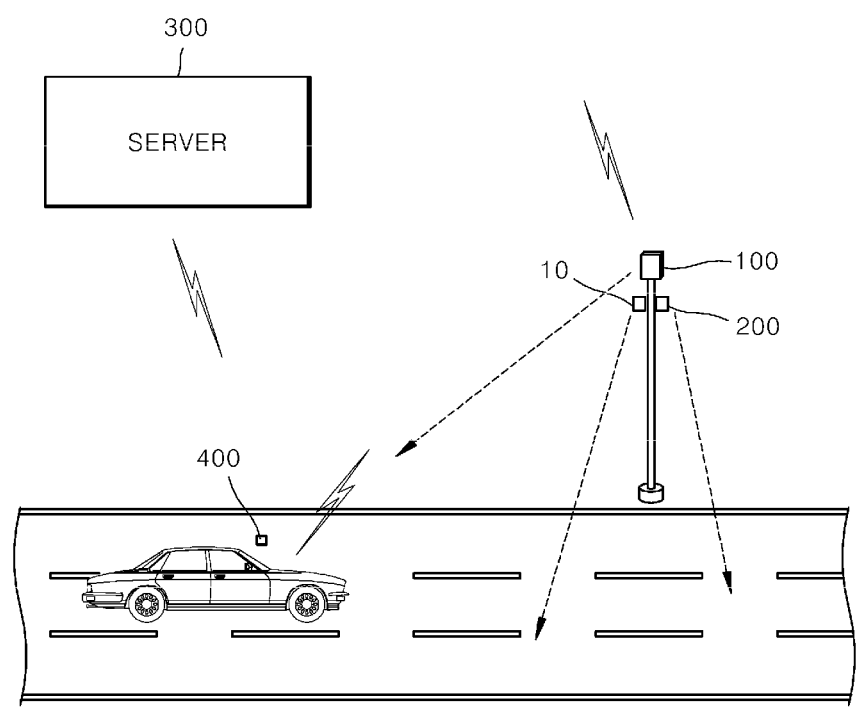
FIG. 1 illustrates a configuration of a system for multi-mode obstacle detection using radar according to an embodiment of the present invention.

FIG. 1 illustrates a configuration of a system for multi-mode obstacle detection using radar according to an embodiment of the present invention.

Referring to FIG. 1, the system for multi-mode obstacle detection using radar includes a radar apparatus 100, an obstacle detection apparatus 200, and a server 300. Here, in FIG. 1, the obstacle detection apparatus 200 has a structure in which the obstacle detection apparatus 200 is connected to the radar apparatus 100 in a wired/wireless manner, and FIG. 1 illustrates an example in which the obstacle detection apparatus 200 is capable of communicating with an external server 300 in the wired/wireless manner.

Of course, the present invention is not necessarily limited to FIG. 1. For example, the obstacle detection apparatus 200 may be provided in a structure in which it is built in the radar apparatus 100, and may be connected to the server 300 in the wired/wireless manner. In addition, the obstacle detection apparatus 200 may be provided at the external server 300 that is connected to the radar apparatus 100 in the wired/wireless manner, or may be disposed adjacent to the server 300 and thus may be connected to the server 300 in the wired/wireless manner. It is obvious that there may be more variety of embodiments of the obstacle detection apparatus 200 within the technical scope of the present invention.

Hereinafter, the system for multi-mode obstacle detection using radar will be briefly described with reference to the embodiment of FIG. 1.

Several radar apparatuses 100 may be installed at a road. The radar apparatus 100 may be installed in a shape of a pole at the roadside or in a shape of a variable message sign (VMS) in the highway, that is, a shape installed in the center of the road, or a movable radar apparatus on which a vehicle can be mounted.

Pieces of radar information on an object detected by each radar apparatus 100 may be collected at the server 300 and may be integrated-analyzed, managed and monitored. Here, the radar information may include data, such as speed information, location information, and size information, which are obtained according to whether the object is detected using radar.

The obstacle detection apparatus 200 may discriminate between a stationary object and a moving object using the radar information on the object obtained by the radar apparatus 100 and may provide modes in which the stationary object, a low-speed object, and a high-speed object can be separately detected according to the detected radar information. Doppler information included in the radar information on the object may be used to select the detecting modes.

Figure 2:
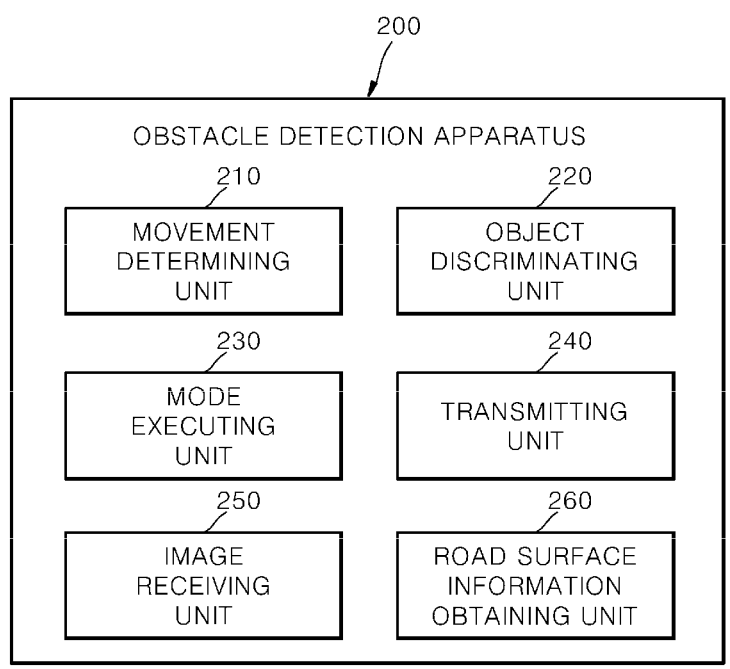
FIG. 2 illustrates a configuration of an obstacle detection apparatus illustrated in FIG.

FIG. 2 illustrates a configuration of an obstacle detection apparatus illustrated in FIG. 1. The obstacle detection apparatus 200 includes a movement determining unit 210, an object discriminating unit 220, a mode executing unit 230, a transmitting unit 240, an image receiving unit 250, and a road surface information obtaining unit 260.

The movement determining unit 210 determines whether an object moves using the radar information on the object obtained by the radar apparatus 100. The object discriminating unit 220 discriminates between a stationary object and a moving object according to whether the object moves. Whether the object moves relates to the presence of doppler. That is, when radar signals having no doppler effect are detected, an object is determined as the stationary object, and in an opposite case, the object is determined as the moving object.

The mode executing unit 230 executes a first detecting mode for detecting the stationary object or a second detecting mode for detecting the moving object. Here, the second detecting mode is later classified as a low-speed object detecting mode and a high-speed object detecting mode. Thus, in the current embodiment, the object detecting mode is classified as three modes (stationary object detection, low-speed object detection, and high-speed object detection).

The transmitting unit 240 transmits location information on the stationary object obtained through the stationary object detecting mode, or location information and speed information on the low-speed object or the high-speed object obtained through the moving object detecting mode to an external terminal 400.

The external terminal 400 may be one of various well-known terminals, such as a personal computer (PC) as a user's terminal, a laptop computer, a mobile phone, and a navigation device installed at a vehicle. For example, when the terminal 400 is a navigation device within the vehicle that is driving on the road side, location information on the object is displayed through the navigation device. In this case, an additional alarm (letter, image form display or speaker output) may be output through the navigation device together with display of the location information on the object, thereby inducing the user to take precautions against the object or to pay attention to the object. According to guide of the location information on the stationary object and the moving object on the road, the user who is driving on the road can check information on a peripheral object in real-time so that safety driving can be induced and various accidents can be prevented in advance.

Furthermore, in case of the moving object, as speed information of the moving object is further transmitted, information on the moving object can be checked in real-time, and a safe action against the moving object can be taken.

FIG. 3 is a flowchart illustrating a method for obstacle detection using FIG. 2. Hereinafter, a method for multimode obstacle detection using radar according to an embodiment of the present invention will be described in detail.

First, the movement determining unit 210 determines whether an object moves using radar information obtained from the radar apparatus 100 (S110).

Subsequently, the object discriminating unit 220 discriminates between a stationary object and a moving object according to whether the object moves (S111). The stationary object or the moving object may be independently present on the road side, or a mixture of the stationary object and the moving object may be present on the road side. The object discriminating unit 220 performs separate discrimination on each of the stationary object and the moving object.

Next, the mode executing unit 230 may execute a detecting mode for the stationary object, a detecting mode for the low-speed object, or a detecting mode for the high-speed object.

First, the detecting mode for the stationary object will be descried. In case of the stationary object, signals having no doppler effect are detected from anti-moving target indicator (MTI).

That is, in Operation S111, when it is determined that there is no object movement, the mode executing unit 230 removes the radar information on the moving object, thereby acquiring only a candidate group of stationary objects (S112). In this case, peripheral, unnecessary clutter components are removed (S113).

Subsequently, the mode executing unit 230 compares the radar information of the stationary object with a threshold (a first threshold) for detecting the stationary object stored in a reference map obtained based on statistical values of pieces of past radar information (S114). If the radar information of the stationary object exceeds the first threshold, the mode executing unit 230 determines that the stationary object is valid and detects the valid stationary object (S115).

The reference map is a map in which statistical values of pieces of past radar information are stored. Radar information in a state in which no obstacle is present in the vicinity of an object, is also stored in the reference map through clutter map processing. In Operation S114, a constant false alarm rate (CFAR) that determines whether there is a target by referring to statistics and a probabilistic theory, i.e., a detection threshold, is used.

If the radar information on the stationary object is less than the first threshold, there may be stochastically no radar information on the stationary object, or the extracted radar information may be wrong. In this case, it is determined that a detection error occurs, and Operation S114 may be re-executed, or the method may go back to Operation S110.

After Operation S115, the mode executing unit 230 obtains location information on the stationary object using radar information of the detected stationary object (S116). Here, the location information includes coordinate information, azimuth information, and the like. A principle of obtaining location information of an object using radar information is already well-known and thus a detailed description thereof will be omitted.

The location information on the stationary object obtained in Operation S116 may be later transmitted to the server 300 (S117) or the external terminal 400 (S118). Of course, when the object detection apparatus 200 is included in the server 300, a process of executing the detecting mode and calculating the location information may be performed on the server 300.

Next, the detecting mode for the moving object will be described.

If it is determined in Operation S111 that there is object movement, the mode executing unit 230 removes radar information on the stationary object, thereby acquiring only a candidate group of moving objects (S121). Then, the detecting mode for the low-speed object or the detecting mode for the high-speed object is executed.

First, the detecting mode for the low-speed object will be described. In case of the low-speed object, an object having less doppler effect, i.e., having comparatively low speed, is detected from a moving target indicator (MTI) using the CFAR.

That is, the mode executing unit 230 compares the radar information on the moving object with a predetermined doppler threshold (S122). In this case, when the radar information on the moving object is less than the doppler threshold, the moving object is determined as the low-speed object, and the low-speed object is extracted (S123).

Subsequently, the mode executing unit 230 compares the radar information on the low-speed object with a threshold (a second threshold) for detecting the low-speed object stored in the reference map (S124). If the radar information on the low-speed object exceeds the second threshold, the mode executing unit 230 determines that the low-speed object is valid and detects the valid low-speed object (S125). That is, a statistical technique is also used to extract the low-speed object.

If the radar information on the low-speed object is less than the second threshold, there may be stochastically no radar information on the low-speed object, or the extracted radar information may be wrong. In this case, it is determined that a detection error occurs, and Operation S124 or S122 may be re-executed, or the method may go back to Operation S110.

Next, the mode executing unit 230 obtains location information and speed information on the low-speed object using the radar information of the low-speed object (S126). Also, a tracking camera 10 on a road where the low-speed object is placed, is driven to receive a captured image on the low-speed object from the image receiving unit 250 and to display the image on a screen so that the obtained low-speed object can be checked. The obtained location information and speed information may be later transmitted to the server 300 (S127) or may be later transmitted to the external terminal 400 (S128). In this case, the transmitted information may include information regarding the captured image in addition to the location information and the speed information.

Next, the detecting mode of the high-speed object will be described. In case of the high-speed object, an object having large doppler effect, i.e., having high movement speed is detected from the MTI using the CFAR.

That is, as a result of comparison of the radar information of the moving object with the predetermined doppler threshold (S122), if the radar information of the moving object exceeds the doppler threshold, the mode executing unit 230 determines the moving object as a high-speed object and extracts the determined high-speed object (S133).

Subsequently, the mode executing unit 230 compares the radar information on the high-speed object with a threshold (a third threshold) for detecting the high-speed object stored in the reference map (S134). If the radar information on the high-speed object exceeds the third threshold, the mode executing unit 230 determines that the high-speed object is valid and detects the valid high-speed object (S135). That is, a statistical technique is also used to extract the high-speed object.

If the radar information on the high-speed object is less than the third threshold, there may be stochastically no radar information on the high-speed object, or the extracted radar information may be wrong. In this case, it is determined that a detection error occurs, and Operation S134 or S122 may be re-executed, or the method may go back to Operation S110.

Next, the mode executing unit 230 obtains location information and speed information on the high-speed object using the radar information on the high-speed object (S136). Also, the tracking camera 10 on a road where the high-speed object is placed, is driven to receive a captured image on the high-speed object from the image receiving unit 250 and to display the image on the screen so that the obtained high-speed object can be checked. The obtained location information and speed information may be later transmitted to the server 300 (S137) or may be later transmitted to the external terminal 400 (S138). In this case, the transmitted information may include information regarding the captured image in addition to the location information and the speed information.

FIG. 4 illustrates another embodiment of FIG. 3. In FIG. 4, in addition to the above-described configuration, after the above-described Operations S116, S126, and S136, permittivity information on a road where an object (in a stationary object detecting mode, a stationary object, and in a moving object detecting mode, a moving object) is placed, is obtained (S201).

That is, the road surface information obtaining unit 260 receives permittivity information included in data regarding reflected waves of radar signals emitted onto a surface of the road and obtains permittivity information on the road. To this end, the road surface information obtaining unit 260 operates while interlocking with the radar apparatus 100.

According to the permittivity information, a state of the road surface may be determined. That is, it is determined from the obtained permittivity information whether the state of the road surface is a normal (dry) state, a wet state, an ice state, or a snow state (S202). In this case, predetermined DB information (road state information according to permittivity) may be referred to.

If the obtained road permittivity information is within a predetermined normal range, i.e., if the current road surface state is the normal (dry) state, the transmitting unit 250 may transmit the location information or the speed information to the external server 300 (S204) and may also transmit the location information or the speed information to the external terminal 400 (S205). In this case, in the stationary object detecting mode, the transmitting unit 250 transmits only the location information, and in the moving object detecting mode, the transmitting unit 250 transmits the location information and the speed information.

If the obtained permittivity information exceeds the normal range, it is perceived that the current road surface state is the wet state, the ice state, or the snow state (S203), and the location information or the speed information, and the state information (the wet state, the ice state, or the snow state) of the road surface corresponding to permittivity of the road surface may be transmitted to the server 300 (S204) and to the external terminal 400 (S205). In this case, in the stationary object detecting mode, the location information and the state information of the road surface are transmitted, and in the moving object detecting mode, all of the location information, the speed information, and the state information of the road surface are transmitted.

The content of FIG. 4 is based on determination whether to the speed or location information on the object is transmitted by interlocking with the state information of the road by referring to permittivity of the road after the speed or location information on the object is obtained through the stationary object detecting mode or the moving object detecting mode.

Of course, unlike this, a process of referring to permittivity of the road may be performed together with starting Operation S110. That is, the process of referring to permittivity of the road may be performed together after Operations S110 and S111 of obtaining information on object movement by acquiring radar information from the radar apparatus 100, and a process of obtaining permittivity information on the road after removing clutter in the vicinity of the stationary or moving object from the obtained radar information and comparing the obtained permittivity information with predetermined DB information (road state information according to permittivity) and determining whether the current road state is within a normal range may be separately performed in parallel to processes to be performed after Operation S110.

Information regarding whether the obtained road state is in the normal range is interlocked with subsequent Operations S116, S126, and S136. That is, after Operations S116, S126, and S136, when the location information or the speed information on the object is transmitted, if the surface state of the road is determined to be in the normal range, only the location information or the speed information is transmitted to the server 300 or the external terminal 400, and if the road state is determined to be not in the normal range, the location information or the speed information and information regarding the surface state of the road are transmitted. It is obvious that there are various modifications of an embodiment of information transmission using the road surface information within the technical scope of the present invention.

As described above, according to the present invention, multi-detection modes can be provided to separately detect the stationary object and the moving object using radar information on the object obtained using radar so that location tracking efficiency for each object can be increased. That is, separate detection modes on the stationary object, the low-speed object, or the high-speed object can be differently executed according to doppler information obtained from the object.

Furthermore, the stationary object, the low-speed object, or the high-speed object can be efficiently detected based on probabilistic statistical data of the previously-collected radar information so that reliability of the result of detection can be enhanced.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method for multi-mode obstacle detection using radar, performed via at least one processor, the method comprising:
   determining whether an object moves using radar information on the object acquired by a radar apparatus;
   discriminating between a stationary object and a moving object according to whether the object moves;
   executing a first detecting mode for detecting the stationary object or a second detecting mode for detecting the moving object;
   transmitting location information on the stationary object obtained through the first detecting mode, or location and speed information on the moving object obtained through the second detecting mode, to a user terminal other than the at least one processor; and
   after location information and speed information on the moving object are obtained, driving a tracking camera on a road where the moving object is placed, so as to receive a captured image on the moving object.

2. The method of claim 1, wherein the executing of the first detecting mode comprises:
   removing radar information on the moving object;
   if the radar information on the stationary object exceeds a threshold for detecting the stationary object stored in a reference map obtained based on statistical values of past radar information, determining that the stationary object is valid; and
   obtaining location information on the stationary object using the radar information on the stationary object.

3. The method of claim 2, wherein the executing of the second detecting mode comprises:
   removing the radar information on the stationary object;
   if the radar information on the moving object is less than a predetermined doppler threshold, determining the moving object as a low-speed object;
   if the radar information on the low-speed object exceeds a threshold for detecting the low-speed object stored in the reference map, determining the low-speed object to be valid; and
   obtaining location information and speed information on the low-speed object using the radar information on the low-speed object.

4. The method of claim 3, further comprising:
   if the radar information on the moving object exceeds the predetermined doppler threshold, determining the moving object as a high-speed object;
   if radar information on the high-speed object exceeds a threshold for detecting the high-speed object stored in the reference map, determining the high-speed object to be valid; and
   obtaining location information and speed information on the high-speed object using the radar information on the high-speed object.

5. The method of claim 4, further comprising, after the location information or speed information on the stationary object or moving object is obtained:
   obtaining permittivity information on the road where the object is placed;
   if the obtained road permittivity information is within a predetermined normal range, transmitting the location information or speed information to an external server or the user terminal; and
   if the obtained permittivity information exceeds the normal range, transmitting the location information or speed information, and state information on the road corresponding to permittivity of the road to the server or the user terminal.

6. An apparatus for multi-mode obstacle detection using radar, the apparatus comprising:
   circuitry configured to:
   determine whether an object moves using a radar apparatus that acquires radar information on the object;
   discriminate between a stationary object and a moving object according to whether the object moves;
   execute a first detecting mode for detecting the stationary object or a second detecting mode for detecting the moving object;
   transmit location information on the stationary object obtained through the first detecting mode, or location and speed information on the moving object obtained through the second detecting mode, to a user terminal other than the circuitry; and
   receive a captured image on the moving object by driving a tracking camera on a road where the moving object is placed.

7. The apparatus of claim 6, wherein the circuitry is further configured to:
   remove radar information on the moving object when the first detecting mode is executed, and
   determine that the stationary object is valid and obtain location information on the stationary object using the radar information on the stationary object if the radar information on the stationary object exceeds a threshold for detecting the stationary object stored in a reference map obtained based on statistical values of past radar information.

8. The apparatus of claim 7, wherein the circuitry is further configured to:
   remove the radar information on the stationary object when the second detecting mode is executed,
   determine the moving object as a low-speed object if the radar information on the moving object is less than a predetermined doppler threshold, and
   determine the low-speed object to be valid and obtain location information and speed information on the low-speed object using the radar information on the low-speed object if the radar information on the low-speed object exceeds a threshold for detecting the low-speed object stored in the reference map.

9. The apparatus of claim 8, wherein, the circuitry is further configured to:
determine the moving object as a high-speed object if the radar information on the moving object exceeds the predetermined doppler threshold, and
determine the high-speed object to be valid and obtain location information and speed information on the high-speed object using the radar information on the high-speed object if radar information on the high-speed object exceeds a threshold for detecting the high-speed object stored in the reference map.

10. The apparatus of claim 9, wherein the circuitry is further configured to:
obtain permittivity information on the road where the object is placed, after the location information or speed information on the stationary object or moving object is obtained, and
wherein, the circuitry is further configured to transmit the location information or speed information to an external server or the user terminal if the obtained road permittivity information is within a predetermined normal range, and transmit the location information or speed information, and state information on the road corresponding to permittivity of the road to the server or the user terminal if the obtained permittivity information exceeds the normal range.

* * * * *